US012421329B1

(12) United States Patent
Chen et al.

(10) Patent No.: US 12,421,329 B1
(45) Date of Patent: Sep. 23, 2025

(54) CONTINUOUS DYNAMIC AND EFFICIENT DEVOLATILIZATION METHOD FOR POLYMER/VOLATILE SYSTEM BASED ON HIGH MASS TRANSFER INTERFACES (71) Applicants: USEON TECHNOLOGY LIMITED, Jiangsu (CN); USEON (ZHENJIANG) INTELLIGENT EQUIPMENT LIMITED, Jiangsu (CN)

(72) Inventors: Zhiqiang Chen, Jiangsu (CN); Tian Xia, Jiangsu (CN); Junquan Song, Jiangsu (CN); Junfeng Chang, Jiangsu (CN); Xuejie Chen, Jiangsu (CN); Yanfei Chen, Jiangsu (CN)

(73) Assignees: USEON TECHNOLOGY LIMITED, Jiangsu (CN); USEON (ZHENJIANG) INTELLEGENT EQUIPMENT LIMITED, Jiangsu (CN)

( * ) Notice: Subject to any disclaimer, the term of this patent is extended or adjusted under 35 U.S.C. 154(b) by 0 days.

(21) Appl. No.: 19/097,950

(22) Filed: Apr. 2, 2025

(30) Foreign Application Priority Data

Dec. 23, 2024 (CN) .................. 202411902965.X (51) Int. Cl.
C08F 6/00 (2006.01)
B01D 19/00 (2006.01)
(Continued)

(52) U.S. Cl.
CPC ............ C08F 6/10 (2013.01); B01D 19/0052 (2013.01); C08F 6/003 (2013.01); C08F 6/12 (2013.01);
(Continued)

(58) Field of Classification Search
CPC .. C08F 6/003; C08F 6/008; C08F 6/10; C08F 6/12; B29B 13/00; B29B 2013/005
See application file for complete search history.

(56) References Cited

U.S. PATENT DOCUMENTS 3,963,558 A * 6/1976 Skidmore ............... B29C 48/76
264/102
4,065,532 A * 12/1977 Wild ...................... B29C 48/76
264/102
(Continued)

FOREIGN PATENT DOCUMENTS

CN 104354283 A * 2/2015 ................ C08F 6/10
CN 107848222 B * 8/2019 ............ C08F 255/02
(Continued)

OTHER PUBLICATIONS

JP-11268098-A (Oct. 5, 1999); machine translation. (Year: 1999).*
Office Action received in corresponding Japanese patent application No. 2025-050739, dated Jun. 26, 2025, 16 pages.

Primary Examiner — Rip A Lee
(74) Attorney, Agent, or Firm — Cooper Legal Group, LLC (57) ABSTRACT The present application discloses a continuous dynamic and efficient devolatilization method for a polymer/volatile system based on high mass transfer interfaces, including the following steps: providing a dynamic single-screw devolatilizer, feeding a polymer solution to the devolatilizer, wherein the polymer solution includes polymer and volatile substances with small molecule weight, and the volatile substances include organic solvents, residual monomers, water or reaction by-products; conveying and compressing polymer materials by the screw downstream a devolatilization section, and extruding the polymer materials out of the dynamic single-screw devolatilizer directly; or providing a side-feeding extruder downstream of the devolatilization section and feeding plastic additives into a devolatilized polymer melt, and then melt blending the plastic additives with the devolatilized polymer melt at an end of the dynamic single-screw devolatilizer before exiting the dynamic single-screw devolatilizer.

9 Claims, 3 Drawing Sheets (51) Int. Cl.
*B29B 13/00* (2006.01)
*C08F 6/10* (2006.01)
*C08F 6/12* (2006.01)
*C08J 3/20* (2006.01)

(52) U.S. Cl.
CPC ............... *C08J 3/201* (2013.01); *B29B 13/00* (2013.01); *B29B 2013/005* (2013.01); *C08F 6/008* (2013.01); *C08J 2323/00* (2013.01)

(56) References Cited

U.S. PATENT DOCUMENTS

| | | | | | |
|---|---|---|---|---|---|
| 4,452,977 | A | * | 6/1984 | Brasz | B29C 48/92 526/348 |
| 4,910,295 | A | * | 3/1990 | Bernier | B01J 8/24 528/502 F |
| 5,756,659 | A | * | 5/1998 | Hughes | B29C 48/395 528/495 |
| 5,851,463 | A | * | 12/1998 | Guntherberg | B29B 7/845 264/102 |
| 5,910,276 | A | * | 6/1999 | Guntherberg | B29C 48/76 264/102 |
| 5,958,316 | A | * | 9/1999 | Guntherberg | C08L 55/02 264/102 |
| 6,924,350 | B2 | * | 8/2005 | Dong | C08G 65/46 528/499 |
| 6,949,622 | B2 | * | 9/2005 | Silvi | C08G 63/89 528/499 |
| 7,122,619 | B2 | * | 10/2006 | Silvi | B82Y 30/00 528/499 |
| 7,906,570 | B2 | * | 3/2011 | Ueda | C08K 5/0091 524/400 |
| 8,140,307 | B2 | * | 3/2012 | Tomiyama | B29C 48/251 703/7 |
| 8,899,820 | B2 | * | 12/2014 | Inagawa | B29B 7/483 366/82 |
| 9,487,635 | B2 | * | 11/2016 | Kirchhoff | B29C 48/385 |
| 9,512,240 | B2 | * | 12/2016 | Kirchhoff | C08F 6/003 |
| 2008/0262196 | A1 | * | 10/2008 | Giammattei | B29B 7/487 528/480 |
| 2020/0215738 | A1 | * | 7/2020 | Shimizu | B29C 48/297 |

FOREIGN PATENT DOCUMENTS

| | | | | |
|---|---|---|---|---|
| CN | 110746524 | B | | 11/2022 |
| EP | 0283460 | A2 | * | 9/1988 ............... C08F 6/10 |
| EP | 2168743 | A1 | | 3/2010 |
| GB | 2156363 | A | * | 10/1985 ............... C08F 10/06 |
| JP | S5752544 | U | | 3/1982 |
| JP | 0788927 | A | * | 4/1995 ............... B29C 48/76 |
| JP | 08258115 | A | * | 10/1996 ............... B29C 47/76 |
| JP | 11268098 | A | * | 10/1999 ............... B29C 48/385 |
| JP | 2000211010 | A | * | 8/2000 ............... B29C 48/55 |
| JP | 2000271985 | A | | 10/2000 |
| JP | 2004066721 | A | * | 3/2004 |
| JP | 2005112869 | A | | 4/2005 |
| JP | 2005112984 | A | * | 4/2005 |
| JP | 3760059 | B2 | * | 3/2006 ............... B29C 48/55 |
| JP | 2009215367 | A | | 9/2009 |
| JP | 2010105285 | A | * | 5/2010 ............... B29C 48/535 |
| JP | 2011116025 | A | | 6/2011 |
| JP | 2014531995 | A | | 12/2014 |
| JP | 7164509 | B2 | | 11/2022 |
| WO | WO-0044549 | A1 | * | 8/2000 ............... B29B 7/845 |
| WO | WO-2009136904 | A2 | * | 11/2009 ............... B29C 48/767 |

* cited by examiner

Slotted right-handed single-flighted threads

CONTINUOUS DYNAMIC AND EFFICIENT DEVOLATILIZATION METHOD FOR POLYMER/VOLATILE SYSTEM BASED ON HIGH MASS TRANSFER INTERFACES

CROSS-REFERENCE TO RELATED APPLICATION

The present application is based on and claims the priority benefits of China application No. 202411902965.X, filed on Dec. 23, 2024. The entirety of China application No. 202411902965.X is hereby incorporated by reference herein and made a part of this specification.

TECHNICAL FIELD

The present application relates to the field of polymer production and processing technology, and, more particularly, to a continuous dynamic and efficient devolatilization method for a polymer/volatile system based on high mass transfer interfaces.

BACKGROUND ART

In the synthesis process of polymers, most synthetic systems coming out of a reactor contain low molecular weight components, such as residual monomers, organic solvents, water, and reaction by-products, collectively referred to as volatiles. The content of these volatile components can reach tens of percentages. The process of removing the above volatile components from the polymer matrix is called devolatilization, which can improve the polymerization degree and performance of the polymer, recover residual monomers and solvents, remove odors, and meet health and environmental requirements. According to the different application fields of polymer products, a target volatile concentration of the devolatilization process can be several thousands to tens of ppm (parts per million), and the energy consumption of the devolatilization process accounts for more than 60% of the entire polymer synthesis process. Therefore, efficient devolatilization is an important means to reduce polymer production costs and improve product quality.

When the volatile matter content in the polymer system is high and the viscosity of the polymer system is low, the system rapidly generates a large number of bubbles under low pressure conditions, and expands due to liquid-phase mass transfer and bubble aggregation, resulting in flash devolatilization. The heat and mass transfer efficiency of flash devolatilization is high, mainly controlled by thermodynamic phase equilibrium. As the concentration of volatile matter in the system decreases and the viscosity of the system increases, the polymer system undergoes foaming devolatilization through processes such as bubble nucleation, growth, aggregation, merging, and rupture. The nucleation and growth of bubbles are the controlling steps of the devolatilization rate, mainly determined by the viscoelasticity and superheat degree of the system. As the concentration of volatiles further decreases, there are few or even no new bubbles generated, and devolatilization is controlled by molecular diffusion at the polymer-gas interface. Diffusion-controlled devolatilization is usually carried out under high vacuum conditions, and increasing the mass transfer interface area between polymer melt and gas phase and promoting surface renewal are effective means to improve devolatilization efficiency. There are many types of devolatilizers in industry, which can be divided into static devolatilizers without mechanical stirring, mainly targeting low viscosity systems, such as flash evaporators and falling strand devolatilizers; and dynamic rotary devolatilizers, which are provided with rotating elements to convey and mix polymer systems, aimed to handle high viscosity polymer systems, such as thin film evaporators and screw devolatilizers. In particular, the screw devolatilizer has the advantages of stable transportation, good heat transfer, uniform mixing, and fast surface renewal rate. It can effectively handle systems with viscosity differences of several orders of magnitude within one screw devolatilizer, making it unique in the devolatilizer.

China patent application no. CN 110746524B discloses a static devolatilizer including an upper phase separation chamber and a bottom distributor subunit, which performs two-step devolatilization to increase the interfacial area of devolatilization and prolong the residence time of the devolatilization process. However, due to the inability of static devolatilizers to quickly perform surface renewals, they are unable to handle polymer systems with high viscosity and low volatile concentration. The residual volatile concentration of the polymer/volatile system leaving the static devolatilizer of this patent application is thousands of ppm, which is higher than the requirements for residual volatile concentration of polymers in most application fields. The twin-screw dynamic devolatilizer disclosed in EP patent application no. 2168743 and U.S. patent application no. 2020/0215738 utilizes a kneading section to apply shear stress to the polymer melt through kneading elements, thereby diverting the melt stream in the screw channels and generating the required mass transfer interface area for devolatilization, promoting surface renewal. However, high shear stress can lead to degradation and color changes of polymers, reducing the quality of polymer products and limiting their application areas. In addition, compared to dynamic single-screw devolatilizers, twin-screw dynamic devolatilizers have a complex structure and higher manufacturing and maintenance costs. There are also some inevitable problems when using traditional dynamic single-screw devolatilizers, specifically as follow.

1. The mass transfer interface generated by the dynamic single-screw devolatilizer is extremely limited, which seriously restricts its devolatilization efficiency;
2. In industrial practice, dynamic single-screw devolatilizers can usually only handle polymer/volatile system with a volatile content of about 1% or even lower, limiting their application range; and
3. When the actual devolatilization conditions change, the twin-screw devolatilizer can adapt to the new working conditions by adjusting the combination of screw elements, while the dynamic single-screw devolatilizer has lower operational flexibility due to the integral screw structure.

SUMMARY

A purpose of the present application is to provide a continuous, dynamic, and efficient devolatilization method for a polymer/volatile system based on high mass transfer interfaces, which solves one or more of the existing technical problems mentioned above.

The present application provides a continuous, dynamic and efficient devolatilization method for a polymer/volatile system based on high mass transfer interfaces, including the following steps:
 providing a dynamic single-screw devolatilizer, wherein the devolatilizer mainly consists of a rotating single screw and a housing; feeding a polymer solution to the dynamic single-screw devolatilizer, wherein the polymer solution includes polymer and volatile substances with small molecule weight, and the volatile substances include organic solvents, residual monomers, water, or reaction by-products; conveying and compressing polymer materials by the screw downstream a devolatilization section, and extruding the polymer materials out of the dynamic single-screw devolatilizer directly; or providing a side-feeding extruder downstream of the devolatilization section and feeding plastic additives into a devolatilized polymer melt, and then melt blending the plastic additives with the devolatilized polymer melt at an end of the dynamic single-screw devolatilizer before exiting the dynamic single-screw devolatilizer.

In some embodiments, the dynamic single screw devolatilizer is sequentially configured with a driving motor and a reduction gearbox, a rear venting section, a feeding section, a first-stage stripping section, a first-stage devolatilization section, a second-stage stripping section, a second-stage devolatilization section, a third-stage stripping section, a third-stage devolatilization section, and a conveying/mixing section from a rear end to a front end.

In particular, the rear venting section, the third-stage stripping section, and the third-stage devolatilization section can be omitted as needed.

In some embodiments, during a devolatilization process, a rear venting devolatilization and a number of stages for front venting devolatilization are selected according to devolatilization requirements; when a concentration of the volatile in the polymer solution entering the dynamic single-screw devolatilizer is 5-20% and still has the potential of flash devolatilization, the rear venting section is configured to discharge the volatile, and the feeding section captures a concentrated polymer solution; and when the concentration of the volatile in the polymer solution entering the dynamic single-screw devolatilizer is less than 2%, the polymer solution directly enters the first-stage stripping section and the-first stage devolatilization section through the feeding section.

In some embodiments, a length L3 of the feeding section is 3-15 D, preferably 6-8 D; a screw at a feed section has a single-flighted or multi-flighted deep-channel threads with a lead of 0.5-4 D, preferably 0.6-1.5 D, more preferably 0.9-1.5 D, and a depth of channel of 0.05-0.4 D, preferably 0.1-0.2 D; and a length L2 of the rear venting section is 3-15 D, preferably 4-6 D; a single or multi-flighted threads are adopted, with a lead of 0.5-4 D, preferably 0.9-1.5 D, and a depth of channel of 0.05-0.4 D, preferably 0.08-0.20 D, wherein the depth of channel gradually decreases or remains unchanged from the feeding section to the reduction gearbox; a temperature of materials entering the dynamic single-screw devolatilizer is higher than a boiling point of the volatile, and a pressure of the materials is higher than a corresponding saturation pressure; and a pressure in the rear venting section is 1-100 kPa, preferably 10-80 kPa, and more preferably 30-60 kPa.

In particular, D is an outer diameter of the screw.

In some embodiments, after being compressed and pressurized in the feeding section, the concentrated polymer solution obtained from the rear venting section enters the first-stage stripping section; a stripping agent is selected from water, $CO_2$, or $N_2$; an injection rate of the stripping agent injected upstream of each stage of devolatilization sections is 0-2 wt % M, preferably 0.2-1 wt % M, and more preferably 0.2-0.5 wt % M; a length of each stage of stripping sections is 1.5-5 D, preferably 2-3D; a screw of each stage of stripping sections is equipped with mixing elements, including pin blocks or slotted flight tips; an end of each stage of stripping sections is provided with a reverse screw element or a restriction ring; a diameter of the restriction ring is 0.9-1.0 D, preferably 0.96-0.99 D; and a width of the restriction ring is 0.01-1 D, preferably 0.05-0.2 D.

In particular, M is a mass flow rate of the polymer melt processed by the devolatilizer, in kg/hr.

In some embodiments, a material flowing out of each stage of stripping sections enters a forced distribution zone within a housing of each stage of devolatilization sections, formed by a distribution ring and a clamping ring thereof, and then flows into a channel of the screw; and a length of the forced distribution zone is 0.1-5 D, preferably 0.5-2D;

the distribution ring includes but is not limited to a slit-type distribution ring and a porous-type distribution ring, a slit width of the slit-type distribution ring is 0.1-5 mm, preferably 0.5-2 mm; a slit length is 10-200 mm, preferably 20-80 mm; a slit spacing is 1-10 mm, preferably 2-3 mm; an inlet of each of slits is chamfered to avoid dead zones on an outer surface of the distribution ring; the slits are aligned with each other or staggered from each other in an axial direction; and the slits are distributed along a straight line or a spiral line in the axial direction; and an end pore diameter of the porous-type distribution ring is 0.2-10 mm, preferably 0.5-3 mm; a hole spacing in a radial direction is 1-10 mm, preferably 2-5 mm; a hole spacing in an axial direction is 1-10 mm, preferably 2-5 mm; an inlet of each of holes is chamfered; and the holes are distributed along a straight line or a spiral line in the axial direction.

In some embodiments, screws at positions of the forced distribution zone and venting zones of each of devolatilization sections have multi-flighted constant-depth, and constant-pitch threads, with a length of 1-10 D, preferably 5-8 D; a lead of the threads is 1-10 D, preferably 2-6 D; a number of the threads is 2-20, preferably 4-12; and a pressure in the venting zone is 0.1-80 kPa, preferably 0.1-60 kPa, and more preferably 0.1-20 kPa.

In some embodiments, the dynamic single-screw devolatilizer further includes the forced distribution zone located between the feeding section and the rear venting section, and the space within the forced distribution zone is formed by the distribution ring and the clamping ring thereof; the length of the forced distribution zone is 0.1-5 D, preferably 0.5-2D;

the distribution ring includes but is not limited to a slit-type distribution ring and a porous-type distribution ring, a slit width of the slit-type distribution ring is 0.1-5 mm, preferably 0.5-2 mm; a slit length is 10-200 mm, preferably 20-80 mm; a slit spacing is 1-10 mm, preferably 2-3 mm; an inlet of each of slits is chamfered to avoid dead zones on an outer surface of the distribution ring; the slits are aligned with each other or staggered from each other in an axial direction; and the slits are distributed along a straight line or a spiral line in the axial direction; and an end pore diameter of the porous-type distribution ring is 0.2-10 mm, preferably 0.5-3 mm; a hole spacing in a radial direction is 1-10 mm, preferably 2-5 mm; a hole spacing in an axial direction is 1-10 mm, preferably 2-5 mm; an inlet of each of holes is chamfered;

and the holes are distributed along a straight line or a spiral line in the axial direction.

In some embodiments, the screw in a rear section of the venting zone conveys and compresses the devolatilized polymer melt; after being pressurized, the devolatilized polymer melt enters a stripping section and devolatilization section in a next stage;

a concentration of the volatile in the polymer melt devolatilized by the dynamic single-screw devolatilizer is 10-3000 ppm, preferably 100-400 ppm, and more preferably 100-200 ppm; and a rotation speed of the dynamic single-screw devolatilizer is 10-300 rpm, preferably 40-200 rpm; and materials output from a final stage of devolatilization section is conveyed and compressed by the screw, and directly exits the dynamic single-screw devolatilizer.

In some embodiments, the screw in a rear section of the venting zone conveys and compresses the devolatilized polymer melt, after being pressurized, the devolatilized polymer melt enters a stripping section and devolatilization section in a next stage;

a concentration of the volatile in the polymer melt devolatilized by the dynamic single-screw devolatilizer is 10-3000 ppm, preferably 100-400 ppm, and more preferably 100-200 ppm; and a rotation speed of the dynamic single-screw devolatilizer is 10-300 rpm, preferably 40-200 rpm; and materials output from a final stage of devolatilization section is thoroughly mixed with the plastic additives from the side-feeding extruder before exiting the dynamic single-screw devolatilizer.

In some embodiments, the plastic additives include antioxidants, UV stabilizers, lubricants, antistatic agents, pigments, and the like.

The present application has the following beneficial effects:
1. Using the dynamic single-screw devolatilizer, the polymer solution with a volatile concentration of 5-10% is devolatilized to a volatile concentration of 10-200 ppm;
2. By designing a new type screw-housing structure for the dynamic single-screw devolatilizer, the mass transfer interface for devolatilization is significantly improved while retaining the advantage of low shear stress; and
3. Different flow-distribution internal components are designed based on different target volatile concentrations, and the target volatilization efficiency is achieved by adjusting the mass transfer interface area on one screw-housing configuration, effectively reducing equipment investment and maintenance costs.

DETAILED DESCRIPTION

The present application will be further described in detail through the following embodiments.

Figure 1:
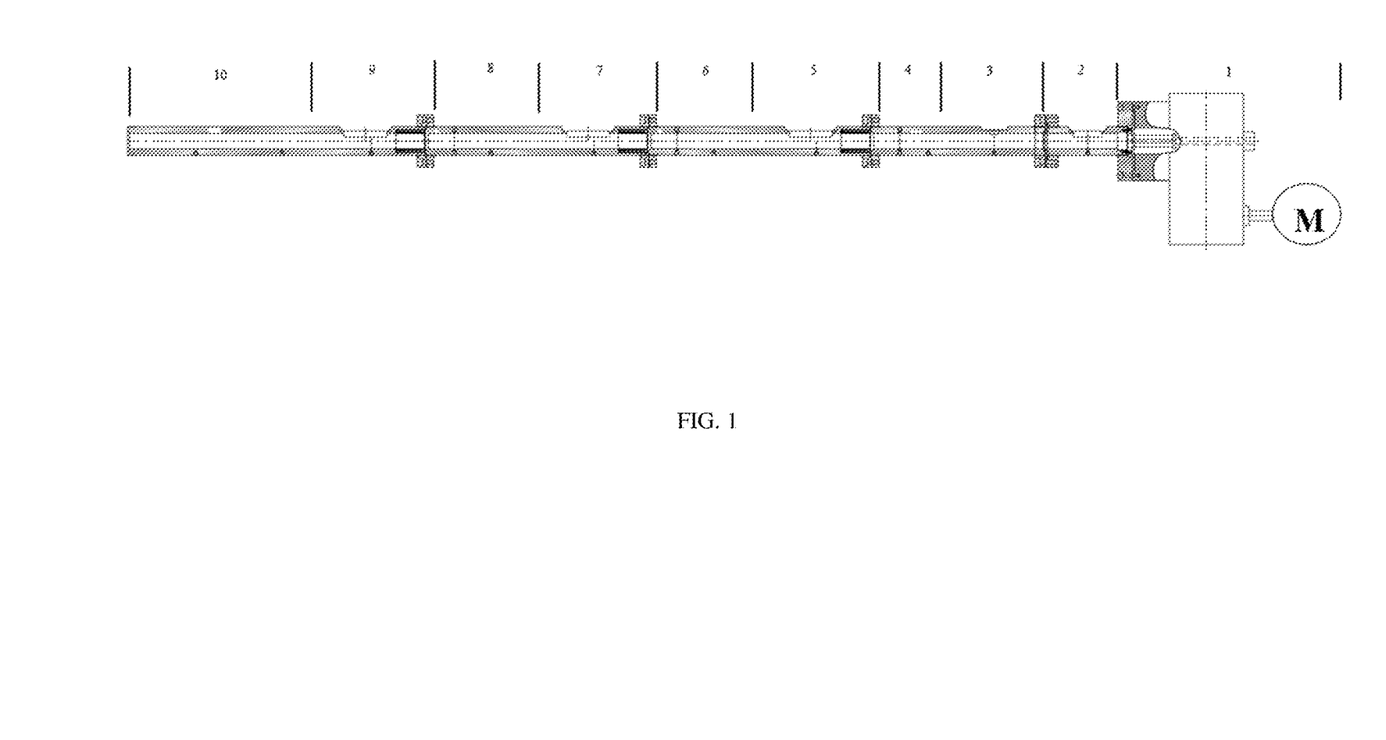
FIG. 1 is a schematic diagram of a dynamic single-screw devolatilizer.
Figure 2:
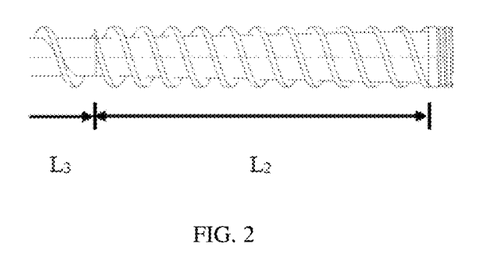
FIG. 2 is a schematic diagram of a screw configuration in a rear venting section.

The present application adopts a dynamic single-screw devolatilizer, which is sequentially configured with a rear venting section, a feeding section, a first-stage front venting section (including a first-stage stripping section and a first-stage devolatilization section), a second-stage front venting section (including a second-stage stripping section and a second-stage devolatilization section), and a third-stage front venting section (including a third-stage stripping section and a third-stage devolatilization section) from a rear end (drive motor/reduction gearbox end) to a front end (die head end) of the single-screw devolatilizer, as shown in FIG. 1. The raw material for the dynamic single-screw devolatilizer is a polymer solution containing volatiles from a polymerization reactor. In the present application, the dynamic single-screw devolatilizer can process the polymer solution with a volatile concentration of up to 20 wt %. In order to achieve desired product performance, a side-feeding extruder can be installed downstream of the last devolatilization section for feeding plastic additives (such as antioxidants, UV stabilizers, lubricants, antistatic agents, pigments, and the like) into the devolatilized polymer melt, which can be melt blended with the devolatilized polymer melt at the end of the dynamic single-screw devolatilizer. An outlet end of the dynamic single-screw devolatilizer is connected to a pelletizing equipment, such as a strand pelletizer or an underwater pelletizer, etc. One or more components, including a screen changer, a melt pump, or a start-up valve, can be installed between the dynamic single-screw devolatilizer and the pelletizer.

In a specific implementation process of devolatilization, the rear venting section and the number of stages for the front venting sections (single-stage, two-stage, or three-stage) can be selected according to the devolatilization requirements. When the concentration of the volatile in the polymer solution entering the dynamic single-screw devolatilizer is high (5-20%) and still has the potential of flash devolatilization, the rear venting section is configured to discharge the volatile, and the feeding section captures the concentrated polymer solution. When the concentration of the volatile in the polymer solution entering the dynamic single-screw devolatilizer is very low (less than 2%), the polymer solution can directly enter the first-stage stripping section and the first-stage devolatilization section through the feeding section. The length L3 of the feeding section is 3-15 D (D is the diameter of the screw), preferably 6-8 D. In particular, for small-scale dynamic devolatilizers, D ranges from 30-150 mm; for large-scale dynamic devolatilizers, D ranges from 150-600 mm. The screw at the feeding section has a single-flighted or multi-flighted deep-channel threads with a lead of 0.5-4 D, preferably 0.6-1.5 D, more preferably 0.9-1.5 D, and a depth of channel of 0.05-0.4 D, preferably 0.1-0.2 D. As shown in FIG. 1, a high-temperature, pressurized polymer solution enters the dynamic single-screw devolatilizer, bubbles generates violently at the feeding position, and immediately expands to fill all screw channels. The length L2 of the rear venting section is 3-15 D, preferably 4-6 D. A single or multi-flighted threads are adopted, with a lead of 0.5-4 D, preferably 0.9-1.5 D, and a depth of channel of 0.05-0.4 D, preferably 0.08-0.20 D. The depth of channel gradually decreases or remains unchanged from the feeding section to the reduction gearbox. The gradual decrease in the depth of the screw channels causes the bubbles to rupture, and the pressure difference causes volatile components to separate as gas, which is then discharged through a rear venting port. A viscous flow generated by the rotation of the screw sends the concentrated polymer solution downstream. The temperature of the material entering the dynamic single-screw devolatilizer is higher than the boiling point of the volatile, and the pressure is higher than the corresponding saturation pressure. The rear venting can operate under atmospheric or vacuum conditions for devolatilization. The pressure in the rear venting section is 1-100 kPa (absolute pressure), preferably 10-80 kPa, and more preferably 30-60 kPa.

After being compressed and pressurized in the feeding section, the concentrated polymer solution obtained from the rear venting section enters the first-stage stripping section 4. The stripping agent is usually selected from water, $CO_2$ or $N_2$, which can effectively reduce the partial pressure of the volatile in the gas phase and improve the mass transfer driving force for devolatilization. The stripping agent can also generate bubbles, increase the gas-liquid mass transfer area, and enhance the devolatilization process.

Figure 3:
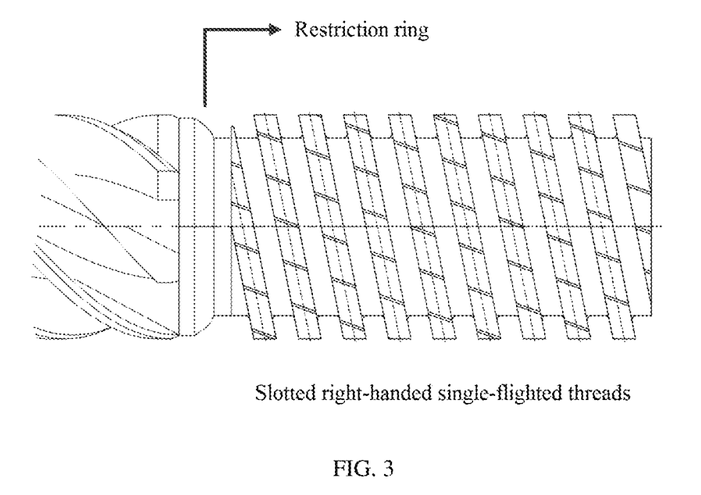
FIG. 3 is a schematic diagram of a screw configuration in each of stripping sections.

The injection rate of the stripping agent injected upstream of each stage of devolatilization sections is 0-2 wt % M (M is the mass flow rate of the polymer melt processed by the devolatilizer, in kg/hr), preferably 0.2-1 wt % M, more preferably 0.2-0.5 wt % M. Depending on the requirements of the devolatilization process, the stripping agent can be injected upstream of the first to third stage devolatilization sections or only upstream of the last one stage or two stage devolatilization sections. The length of each stage of stripping sections is 1.5-5 D, preferably 2-3D. After injecting the stripping agent, the rotating screw breaks the stripping agent into a large number of small bubbles that are evenly dispersed in the polymer solution. The rotation speed of a single-screw is 10-300 rpm, preferably 60-200 rpm. The screw of each stage of stripping sections is equipped with mixing elements, such as pin blocks or slotted flight tips. The end of each stage of stripping sections is provided with a reverse screw element or a restriction ring, as shown in FIG. 3. The diameter of the restriction ring is 0.9-1.0 D, preferably 0.96-0.99 D. The width of the restriction ring is 0.01-1 D, preferably 0.05-0.2 D.

Figure 4:
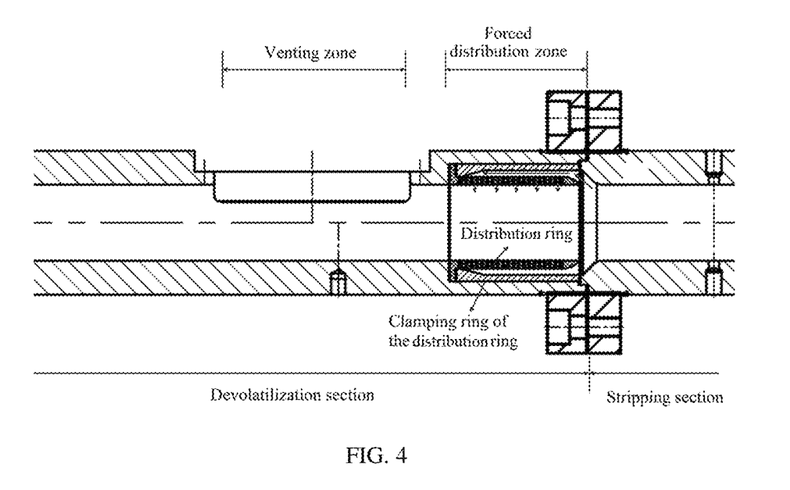
FIG. 4 is a schematic diagram of a housing structural of each of devolatilization sections.
Figure 5:
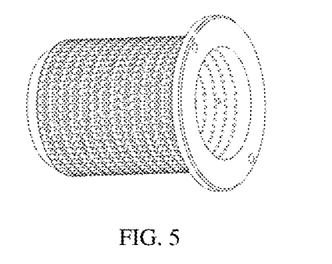
FIG. 5 is a schematic diagram of a porous-type distribution ring.
Figure 6A:
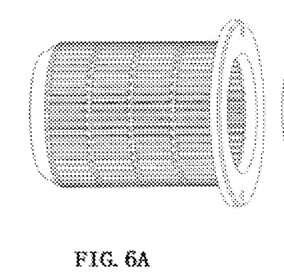
FIG. 6A is a schematic diagram of a slit-type distribution ring; 6B is a schematic diagram of a left-handed slit-type distribution ring; and 6C is a schematic diagram of a right-handed slit-type distribution ring.
Figure 6B:
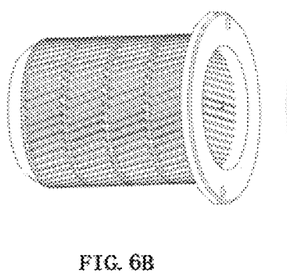
Figure 6C:
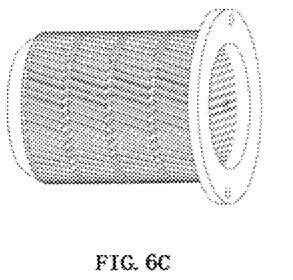

Due to the blocking effect of the reverse screw element or restriction ring, the material flowing out of each stage of stripping sections cannot flow downstream along the screw, and enters the space formed by a distribution ring and a clamping ring thereof in the forced distribution zone in the housing of each stage of devolatilization sections, and then flows out into the screw channels of the screw, as shown in FIG. 4. The distribution ring forces the melt to split, creating a large surface area of the melt, providing a gas-liquid phase interface for devolatilization. The phase interface generated by the forced distribution is continuously renewed, greatly improving the devolatilization efficiency of the dynamic single-screw devolatilizer. The length of the forced distribution zone is 0.1-5 D, preferably 0.5-2D. Typical distribution rings include, but not limited to, a slit-type distribution ring and a porous-type distribution ring, as shown in FIGS. 5 and 6. The slit width of the slit-type distribution ring is 0.1-5 mm, preferably 0.5-2 mm. The slit length is 10-200 mm, preferably 20-80 mm. The slit spacing (including axial and radial) is 1-10 mm, preferably 2-3 mm. The inlet of each of slits is chamfered to avoid dead zones on the outer surface of the distribution ring. The slits are aligned with each other or staggered from each other in an axial direction. The slits can be distributed along a straight line or a spiral line in the axial direction. The end pore diameter of the porous-type distribution ring is 0.2-10 mm, preferably 0.5-3 mm. The hole spacing in the radial direction is 1-10 mm, preferably 2-5 mm. The hole spacing in the axial direction is 1-10 mm, preferably 2-5 mm. The inlet of each of holes is chamfered. The holes are distributed along a straight line or a spiral line in the axial direction.

Figure 7:
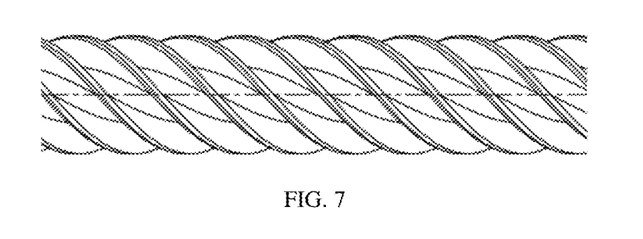
FIG. 7 is a schematic diagram of a multi-flighted thread screw configuration of each of devolatilization sections.

The screws at positions of the forced distribution zone and venting zones of each of devolatilization sections have multi-flighted constant-depth and constant-pitch threads, as shown in FIG. 7, with a length of 1-10 D, preferably 5-8 D. The lead of the threads is 1-10 D, preferably 2-6 D. The number of the threads is 2-20, preferably 4-12. The number of the threads refers to the number of thread tips on the cross-section of the screw, which is the most important screw parameter affecting diffusion-controlled devolatilization. Increasing the number of threads enhances melt splitting within screw channels, thereby enlarging the interfacial area of melt films and promoting their surface renewal rate. As the diameter of the screw decreases, increasing the number of the threads will significantly increase the difficulty of machining. The pressure (absolute pressure) in the venting zone is 0.1-80 kPa, preferably 0.1-60 kPa, and more preferably 0.1-20 kPa. As the content of the volatile in the raw material solution decreases or with the progress of devolatilization, the operating pressure in the venting zone can gradually decrease to improve devolatilization efficiency. The concentration of the volatile in the polymer melt devolatilized by the dynamic single-screw devolatilizer is 10-3000 ppm, depending on factors such as the volatile concentration in the raw material solution, devolatilization technology, and the performance requirements of the target product. The concentration of the volatile is preferably 100-400 ppm, more preferably 100-200 ppm.

The screw in the rear section of the venting zone conveys and compresses the devolatilized polymer melt; after being pressurized, the devolatilized polymer melt enters a stripping section and devolatilization section in a next stage. The configuration of the housing and screw, and process conditions for each stage of stripping sections and devolatilization sections can be identical, or adjusted accordingly as devolatilization progresses and the volatile content in the polymer melt decreases. The material output from the final stage of devolatilization section can be conveyed and compressed by the screw, and directly exit the dynamic single-screw devolatilizer. The material output from the final stage of devolatilization section can also be fully mixed with the plastic additives from the side-feeding extruder, such as antioxidants, UV stabilizers, lubricants, antistatic agents, pigments, and the like, and then exit the dynamic single-screw devolatilizer.

With the different properties of the polymer being processed, such as rheological properties, and the different volatile content in the raw material solution entering the devolatilizer, the devolatilization efficiency of the dynamic single-screw devolatilizer can be adjusted by selecting different types and sizes of internal components in the distribution ring, thereby improving the operational flexibility of the dynamic single-screw devolatilizer. Compared with conventional single-screw devolatilizers, the rear venting section involved in the present application can significantly increase the maximum allowable concentration of the volatile in the polymer solution entering the dynamic single-screw devolatilizer, reaching up to 20 wt %. When the concentration of the volatile in the raw material entering the dynamic single-screw devolatilizer is low, the rear venting section can also be omitted. The number of devolatilization stages and the operating pressure of the front and rear venting zones can be selected taking into account factors such as equipment and process costs, as well as process stability. As the number of devolatilization stages increases and the venting pressure decreases, the devolatilization efficiency increases. An increase in the number of devolatilization stages will increase equipment costs. Under specific operating conditions, reducing the pressure in the venting zone will increase the energy consumption of the process, increase the risk of material overflow in the venting zone, and disrupt the stability of the process. In addition, the novel dynamic single-screw devolatilizer of the present application maintains the advantage of low shear stress of the single-screw devolatilizer while significantly improving the devolatilization interface area and efficiency through the setup of the internal components of the distribution ring.

In order to simulate the material system in the polymerization reactor, in all embodiments of the present application, a twin-screw extruder with a solvent injection system is installed at the feeding section of the dynamic single-screw devolatilizer to achieve the mixing and dissolution of polymer resin raw materials and solvent system in a certain proportion, and obtain a polymer solution with a certain temperature, pressure, and solvent concentration as the raw material solution of the dynamic single-screw devolatilizer.

The embodiments of the present application mainly use polyolefin elastomer POE as the devolatilization polymer, in which the selected POE has a melt flow index of 0.5 and 5 g/10 min (2.16 kg/10 min). The solvent used is a mixture of 1-octene and n-hexane, with a mass ratio of 7:3. After the polymer melt exits the dynamic single-screw devolatilizer, the polymer melt enters the underwater pelletizing system through the start-up valve to produce POE particles. The content of the volatile in POE particles is measured by headspace gas chromatography. The operating conditions for a typical headspace sampler are as follows: vial temperature of 190° C., equilibration time of 20 minutes; loop temperature of 170° C., loop time of 25 minutes; transfer line temperature of 160° C., transfer line time of 0.15 min, and transfer loop equilibration time of 0.02 min.

Example 1

The dynamic single-screw devolatilizer used in this example had a screw diameter of D=58 mm and a length-to-diameter ratio of L/D=60, and was configured with a rear venting section and three stages of front venting sections. The length of the feeding section was 6.5 D. The lead of the screw at the feeding inlet position was 1.0 D, and the depth of the screw channel was 0.2 D. The length of the rear venting section was 5.5 D, with the same lead as the feeding section of 1.0 D, and the depth of the screw channel gradually decreases from 0.2 D to 0.07 D. The configuration of the housing and screw of the stripping sections of the three front venting stages were identical. The length of each stage of stripping sections was 2D, using slotted right-handed single-flighted threads. The diameter of the restriction ring was 0.97 D and the width was 9 mm. The length of three stages of the forced distribution zone was 1.4 D. The first stage forced distribution zone adopts a porous-type distribution ring with a hole diameter of 1.5 mm, a hole spacing in a radial direction of 1.8 mm, and a hole spacing in an axial direction of 6 mm. The second stage forced distribution zone and the third stage forced distribution zone adopt slit-type restriction rings with a slit width of 1 mm, a slit length of 18 mm, and a slit spacing in a radial and an axial directions of 3 mm. The forced distribution zone and venting zone in the devolatilization section were provided with 6-flighted threads. The length of the first-stage devolatilization section was 5 D, and the length of the second-stage devolatilization section and the third-stage devolatilization section was 5.5 D, with a lead of 3D. The rotation speed of the screw was 200 rpm. The downstream of the dynamic single-screw devolatilizer was sequentially provided with a start-up valve and an underwater pelletizing system.

This example adopts a polyolefin elastomer POE with a melt flow index of 0.5 g/10 min (2.19 kg/190° C.), and a solvent of a mixture of 1-octene and n-hexane (mass ratio of 7:3), achieving a total yield of 60 kg/hr, and a concentration the solvent of 8 wt %. The temperature of the raw material solution was 220° C., and the housing temperature of the dynamic single-screw devolatilizer was 220° C. The operating pressure of the rear venting section was 30 kPa, and no stripping agent was injected in front of the first-stage front venting section. The operating pressure of the first-stage venting section was 30 kPa. Using water as the stripping agent, the injection rate of the stripping agent in the second-stage stripping section and the third-stage stripping section was 2 mL/min, with the operating pressure at the second and third venting port of 1 kPa and 0.2 kPa, respectively.

The final POE particles have 125 ppm of 1-octene and 15 ppm of n-hexane.

Example 2

The dynamic single-screw devolatilizer used in this example had a screw diameter of D=58 mm and a length-to-diameter ratio of L/D=47, and was configured with a rear venting section and two stages of front venting sections. The length of the feeding section was 5 D. The lead of the screw at the feeding inlet position was 0.8 D, and the depth of the screw channel was 0.25 D. The length of the rear venting section was 5 D, with the same lead as the feeding section of 0.8 D, and the depth of the screw channel gradually decreases from 0.25 D to 0.08 D. The configuration of the housing and screw of the stripping sections of the two front venting stages were identical. The length of each stage of the stripping sections was 2.5 D, using slotted right-handed single-flighted threads. The diameter of the restriction ring was 0.97 D and the width was 9 mm. The length of the first stage forced distribution zone was 1.4 D. The first stage forced distribution zone adopts a porous-type distribution ring with a hole diameter of 1.2 mm, a hole spacing in a radial direction of 2 mm, and a hole spacing in an axial direction of 4 mm. The length of the second stage forced distribution zone was 2D, adopting a slit-type distribution ring with a slit width of 1 mm, a slit length of 16 mm, and a slit spacing in a radial and an axial directions of 3 mm. The forced distribution zone and venting zone downstream in the devolatilization section were provided with 6-flighted threads. The length of the first-stage devolatilization section was 5 D, and the length of the second-stage devolatilization section was 6 D, with a lead of 2.5 D. The rotation speed of the screw was 200 rpm. The downstream of the dynamic single-screw devolatilizer was sequentially provided with a start-up valve and an underwater pelletizing system.

This example adopts a polyolefin elastomer POE, with a melt flow index of 5 g/10 min (2.19 kg/190° C.), and a solvent of a mixture of 1-octene and n-hexane (mass ratio of 7:3), achieving a total yield of 80 kg/hr, and a concentration of the solvent of 5 wt %. The temperature of the raw material solution was 200° C., and the housing temperature of the dynamic single-screw devolatilizer was 200° C. The operating pressure of the rear venting section was 10 kPa. Using water as the stripping agent, the injection rate of the stripping agent in the first-stage stripping section and the second-stage stripping section was 3 mL/min, with the operating pressure at the first and second venting port of 0.5 kPa and 0.2 kPa, respectively.

The final POE particles have 65 ppm of 1-octene and 5 ppm of n-hexane.

Example 3

The dynamic single screw devolatilizer used in this example had a screw diameter of D=58 mm and a length-to-diameter ratio of L/D=60, and was configured with a rear venting section and three stages of front venting section. The length of the feeding section was 10 D. The lead of the screw at the feeding inlet position was 2.0 D, and the depth of the screw channel was 0.3 D. The length of the rear venting section was 10.0 D, with the same lead as the feeding section of 1.5 D, and the depth of the screw channel gradually decreases from 0.3 D to 0.2 D. The configuration of the housing and screw of the stripping sections of the three front venting stages were identical. The length of each stage of stripping sections was 5 D, using slotted right-handed single-flighted threads. The diameter of the restriction ring was 1.0 D and the width was 15 mm. The length of the three stages of the forced distribution zone was 5 D. The first stage forced distribution zone adopts a porous-type distribution ring with a hole diameter of 5 mm, a hole spacing in a radial direction of 6 mm, and a hole spacing in an axial direction of 10 mm. The second stage forced distribution zone and the third stage forced distribution zone adopt slit-type distribution rings with a slit width of 5 mm, a slit length of 50 mm, and a slit spacing in a radial and an axial directions of 5 mm. The forced distribution zone and venting zone in the devolatilization section were provided with 20-flighted threads. The length of the first-stage devolatilization section was 10 D, and the length of the second-stage devolatilization section and the third-stage devolatilization section was 8 D, with a lead of 8 D. The rotation speed of the screw was 300 rpm. The downstream of the dynamic single-screw devolatilizer was sequentially provided with a start-up valve and an underwater pelletizing system.

This example adopts a polyolefin elastomer POE, with a melt flow index of 0.5 g/10 min (2.19 kg/190° C.), and a solvent of a mixture of 1-octene and n-hexane (mass ratio of 7:3), achieving a total yield of 50 kg/hr, and a concentration the solvent of 5 wt %. The temperature of the raw material solution was 230° C., and the housing temperature of the dynamic single-screw devolatilizer was 230° C. The operating pressure of the rear venting section was 20 kPa, and no stripping agent was injected in front of the first-stage front venting section. The operating pressure of the first stage front venting section was 5 kPa. Using water as the stripping agent, the injection rate of the stripping agent in the second-stage stripping section and the third stage stripping section was 2 mL/min, with the operating pressure at the second and third venting port of 1 kPa and 0.2 kPa, respectively.

The final POE particles have 25 ppm of 1-octene and 8 ppm of n-hexane.

Example 4

The dynamic single screw devolatilizer used in this example had a screw diameter of D=58 mm and a length-to-diameter ratio of L/D=60, and was configured with a rear venting section and three stages of front venting sections. The length of the feeding section was 4 D. The lead of the screw at the feeding inlet position was 2.0 D, and the depth of the screw channels was 0.15 D. The length of the rear venting section was 4.0 D, with the same lead as the feeding section of 0.5 D, and the depth of the screw channel gradually decreases from 0.15 D to 0.05 D. The configuration of the housing and screw of the stripping sections of the three front venting stages were identical. The length of each stage of stripping sections was 1.5 D, using slotted right-handed single-flighted threads. The diameter of the restriction ring was 0.9 D and the width was 6 mm. The length of the third stage forced distribution zone was 1 D. The first stage forced distribution zone adopts a porous-type distribution ring with a hole diameter of 1 mm, a hole spacing in a radial direction of 1 mm, and a hole spacing in an axial direction of 1 mm. The second stage forced distribution zone and the third stage forced distribution zone adopt slit-type distribution rings with a slit width of 1 mm, a slit length of 10 mm, and a slit spacing in a radial and an axial directions of 1 mm. The forced distribution zone and venting zone in the devolatilization section were provided with 2-flighted threads. The length of the first-stage devolatilization section was 4 D, and the length of the second-stage devolatilization section and the third-stage devolatilization section was 5 D, with a lead of 1.5 D. The rotation speed of the screw was 200 rpm. The downstream of the dynamic single-screw devolatilizer was sequentially provided with a start-up valve and an underwater pelletizing system.

This example adopts a polyolefin elastomer POE, with a melt flow index of 0.5 g/10 min (2.19 kg/190° C.), and a solvent of a mixture of 1-octene and n-hexane (mass ratio of 7:3), achieving a total yield of 55 kg/hr, and a concentration the solvent of 8 wt %. The temperature of the raw material solution was 230° C., and the housing temperature of the dynamic single-screw devolatilizer was 230° C. The operating pressure of the rear venting section was 26 kPa, and no stripping agent was injected in front of the first-stage front venting section. The operating pressure of the first-stage front venting section was 10 kPa. Using water as the stripping agent, the injection rate of the stripping agent in the second stage front venting section and the third stage front venting section was 2 mL/min, with the operating pressure at the second and third venting port of 1 kPa and 0.2 kPa, respectively.

The final POE particles have 165 ppm of 1-octene and 25 ppm of n-hexane.

In summary, the continuous dynamic and efficient devolatilization method of the present application has the following advantages:

1. Using the dynamic single-screw devolatilizer, the volatile content in the polymer solution is reduced from 5-10% to 10-200 ppm;
2. By designing a new type screw-housing structure for the dynamic single-screw devolatilizer, the mass transfer interface for devolatilization of the single-screw devolatilizer is significantly improved while retaining the advantage of low shear stress; and
3. Different internal components of distribution rings are designed based on different target volatile concentrations and polymers, enabling the adjustment of the mass transfer interface area on one single screw-housing configuration to achieve desired devolatilization efficiency, effectively reducing equipment investment and maintenance costs.

The above statements are only preferred embodiments of the present application. It should be noted out that, for a person skilled in the art, several modifications and improvements can be made without departing from the inventive concept of the present application, which should also be considered within the scope of protection of the present application.

LISTING OF REFERENCE SIGNS

1. Drive motor and reduction gearbox;
2. Rear venting section;
3. Feeding section;
4. First-stage stripping section;
5. First-stage devolatilization section;
6. Second-stage stripping section;
7. Second-stage devolatilization section;
8. Third-stage stripping section;
9. Third-stage devolatilization section;
10. Conveying/mixing section.

What is claimed is:

1. A continuous dynamic and efficient devolatilization method for a polymer/volatile system based on high mass transfer interfaces, comprising the following steps:
   providing a dynamic single-screw devolatilizer, wherein the dynamic single-screw devolatilizer comprises a rotating single screw and a housing; feeding a polymer solution to the dynamic single-screw devolatilizer, wherein the polymer solution comprises polymer and volatile substances, and the volatile substances comprise organic solvents, residual monomers, water, or reaction by-products; conveying and compressing polymer materials by the rotating single screw downstream of a devolatilization section, and extruding the polymer materials out of the dynamic single-screw devolatilizer directly; or
   providing a side-feeding extruder downstream of a devolatilization section and feeding plastic additives into a devolatilized polymer melt, and then melt blending the plastic additives with the devolatilized polymer melt at an end of a dynamic single-screw devolatilizer before exiting the dynamic single-screw devolatilizer;
   wherein the dynamic single-screw devolatilizer is sequentially configured with a driving motor and a reduction gearbox, a rear venting section, a feeding section, a first-stage stripping section, a first-stage devolatilization section, a second-stage stripping section, a second-stage devolatilization section, a third-stage stripping section, a third-stage devolatilization section, and a conveying/mixing section from a rear end to a front end of the dynamic single-screw devolatilizer.

2. The continuous dynamic and efficient devolatilization method for a polymer/volatile system based on high mass transfer interfaces according to claim 1, wherein during a devolatilization process, a rear venting devolatilization and a number of stages for front venting devolatilization are selected according to devolatilization requirements; when a concentration of the volatile substances in the polymer solution entering the dynamic single-screw devolatilizer are is 5-20 wt % and still has a potential of flash devolatilization, the rear venting section is configured to discharge the volatile substances, and the feeding section captures a concentrated polymer solution; and when the concentration of the volatile substances in the polymer solution entering the dynamic single-screw devolatilizer is less than 2 wt %, the polymer solution directly enters the first-stage stripping section and the first-stage devolatilization section through the feeding section.

3. The continuous dynamic and efficient devolatilization method for a polymer/volatile system based on high mass transfer interfaces according to claim 1, wherein a length of the feeding section is 3-15 D; a screw at the feed section has single-flighted or multi-flighted deep-channel threads with a lead of 0.5-4 D and a depth of channel of 0.05-0.4 D; and a length of the rear venting section is 3-15 D; single or multi-flighted threads are adopted, with a lead of 0.5-4 D and a depth of channel of 0.05-0.4 D, wherein the depth of channel gradually decreases or remains unchanged from the feeding section to the reduction gearbox; a temperature of materials entering the dynamic single-screw devolatilizer is higher than a boiling point of the volatile substances, and a pressure of the materials is higher than a corresponding saturation pressure; and a pressure in the rear venting section is 1-100 kPa.

4. The continuous dynamic and efficient devolatilization method for a polymer/volatile system based on high mass transfer interfaces according to claim 3, wherein after being compressed and pressurized in the feeding section, a concentrated polymer solution obtained from the rear venting section enters the first-stage stripping section; a stripping agent is selected from water, $CO_2$, or $N_2$; an injection rate of the stripping agent injected upstream of each stage of devolatilization sections is 0-2 wt % M; a length of each stage of stripping sections is 1.5-5 D; a screw of each stage of the stripping sections is equipped with mixing elements, comprising pin blocks or slotted flight tips; an end of each stage of the stripping sections is provided with a reverse screw element or a restriction ring; a diameter of the restriction ring is 0.9-1.0 D; and a width of the restriction ring is 0.01-1 D.

5. The continuous dynamic and efficient devolatilization method for a polymer/volatile system based on high mass transfer interfaces according to claim 4, wherein a material flowing out of each stage of the stripping sections enters a forced distribution zone within a housing of each stage of the devolatilization sections, formed by a distribution ring and a clamping ring of the distribution ring, and then flows into a channel of a screw of a corresponding stage of the devolatilization sections; and a length of the forced distribution zone is 0.1-5 D;
   the distribution ring comprises a slit-type distribution ring and a porous-type distribution ring, a slit width of the slit-type distribution ring is 0.1-5 mm; a slit length of the slit-type distribution ring is 10-200 mm; a slit spacing of the slit-type distribution ring is 1-10 mm; an inlet of each of slits of the slit-type distribution ring is chamfered to avoid dead zones on an outer surface of the of the slit-type distribution ring; the slits of the slit-type distribution ring are aligned with each other or staggered from each other in an axial direction; and the slits of the slit-type distribution ring are distributed along a straight line or a spiral line in the axial direction; and
   an end pore diameter of the porous-type distribution ring is 0.2-10 mm; a hole spacing of the porous-type distribution ring in a radial direction is 1-10 mm; a hole spacing of the porous-type distribution ring in an axial direction is 1-10 mm; an inlet of each of holes of the porous-type distribution ring is chamfered; and the holes of the porous-type distribution ring are distributed along a straight line or a spiral line in the axial direction.

6. The continuous dynamic and efficient devolatilization method for a polymer/volatile system based on high mass transfer interfaces according to claim 5, wherein screws at positions of the forced distribution zone and venting zones of each of the devolatilization sections have multi-flighted constant-depth and constant-pitch threads, with a length of 1-10 D; a lead of the multi-flighted constant-depth and constant-pitch threads is 1-10 D; a number of the multi-flighted constant-depth and constant-pitch threads is 2-20; and a pressure in each of the venting zones is 0.1-80 kPa.

7. The continuous dynamic and efficient devolatilization method for a polymer/volatile system based on high mass transfer interfaces according to claim 5, wherein a screw in a rear section of a venting zone conveys and compresses the devolatilized polymer melt; after being pressurized, the devolatilized polymer melt enters a stripping section and devolatilization section in a next stage;
   a concentration of the volatile substances in the devolatilized polymer melt devolatilized by the dynamic single-screw devolatilizer is 10-3000 ppm; and a rotation speed of the dynamic single-screw devolatilizer is 10-300 rpm; and
   materials output from a final stage of devolatilization section are conveyed and compressed by the screw in the rear section, and directly exits the dynamic single-screw devolatilizer.

8. The continuous dynamic and efficient devolatilization method for a polymer/volatile system based on high mass transfer interfaces according to claim 5, wherein a screw in a rear section of a venting zone conveys and compresses the devolatilized polymer melt; after being pressurized, the devolatilized polymer melt enters a stripping section and devolatilization section in a next stage;
   a concentration of the volatile substances in the devolatilized polymer melt devolatilized by the dynamic single-screw devolatilizer is 10-3000 ppm; and a rotation speed of the dynamic single-screw devolatilizer is 10-300 rpm; and
   materials output from a final stage of devolatilization section are thoroughly mixed with the plastic additives from the side-feeding extruder before exiting the dynamic single-screw devolatilizer.

9. The continuous dynamic and efficient devolatilization method for a polymer/volatile system based on high mass transfer interfaces according to claim 8, wherein the plastic additives comprise antioxidants, ultraviolet (UV) stabilizers, lubricants, antistatic agents, and pigments.

* * * * *